Oct. 6, 1931.  H. BECK  1,826,235

COMBINATION LOCK

Filed March 9, 1929    2 Sheets-Sheet 1

Oct. 6, 1931. H. BECK 1,826,235
COMBINATION LOCK
Filed March 9, 1929 2 Sheets-Sheet 2
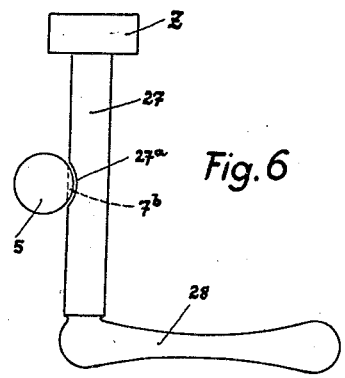
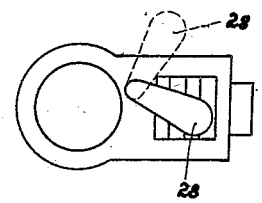
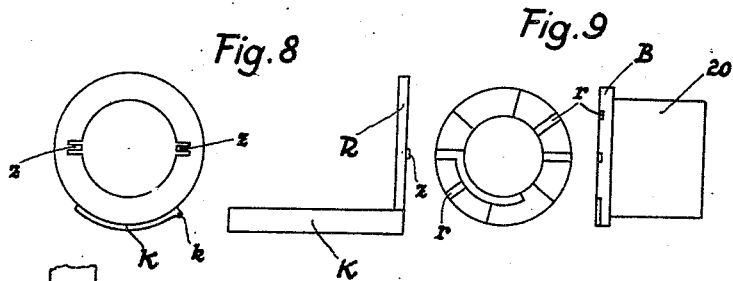
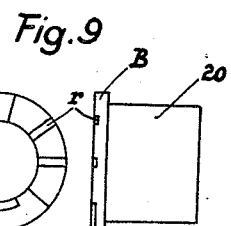
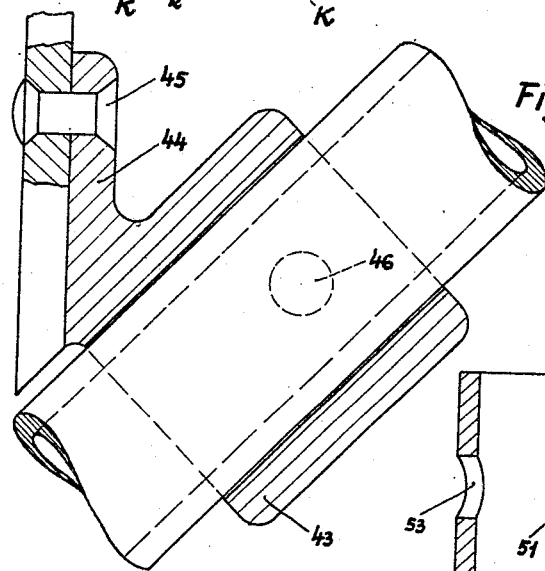
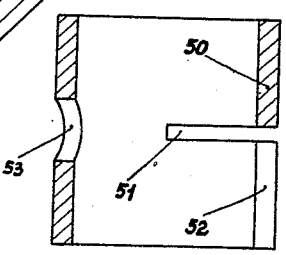

Patented Oct. 6, 1931

1,826,235

UNITED STATES PATENT OFFICE

HEINRICH BECK, OF VIENNA, AUSTRIA

COMBINATION LOCK

Application filed March 9, 1929, Serial No. 345,671, and in Austria March 13, 1928.

This invention relates to improvements in combination locks, particularly for locking the steering pillar of motor vehicles.

It is already known to lock the steering pillar of motor vehicles by means of a combination lock, in which adjustable bolting members (for instance character or numeral rings) concentrically enclose the steering pillar. However the known combination locks of this character posseses two drawbacks. They are very bulky and therefore of clumsy appearance, because the inner diameter of the character rings has to correspond to the outer diameter of the steering pillar, and further the number set by the character rings cannot be read off comfortably, because the individual figures of the set number are arranged parallel to the axis of the steering pillar.

The drawbacks above mentioned are not present in the combination lock according to the present invention, in which the casing of the lock, enclosing the steering pillar, is provided with a lateral extension, the parts of the combination device being located in the latter and the bolt for locking the steering pillar can be shifted in the said extension towards or away from the said pillar and can be fixed in position by the combination device.

The casing of the lock enclosing the steering pillar is not provided with any parts of the combination device and therefore is of sufficient thickness only to withstand any strain or stress. The inner diameter of the character rings located in the extension of the casing is determined by the diameter of the locking bolt, which of course is considerably smaller than the diameter of the steering pillar.

The character rings are arranged to form a horizontal cylinder provided on the outer surface with the signs (figures or letters) so as to warrant a comfortable reading of the adjusted number or name, which appear also in a horizontal row.

Several modes of carrying out the present invention are illustrated by way of example on the accompanying sheets of drawings in which—

Figs. 6 and 7 illustrate a supplementary device for operating the ignition device.

Figs. 8 and 9 are detail views.

Figs. 10 and 11 show parts for fitting the lock to steering pillars of different size or construction.

Figure 1:
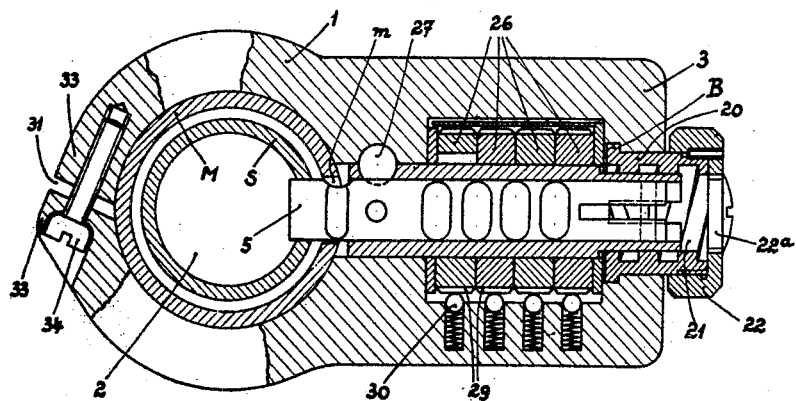
Figs. 1 and 2 show in part-sectional elevation and side view respectively one embodiment of the invention.

The casing 1 of the lock is provided with a cylindric bore 2 in order to be fitted to the steering pillar, consisting of the immovable shell M and the rotatable shaft S. The casing 1 terminates in a frame-like lateral extension 3, the bore or hole of the latter extending transversely to the steering pillar and serves for the reception of the locking mechanism, which consists of a locking bolt and a combination device.

As stated, the locking mechanism consists of the locking bolt 5, which is provided with four notches or grooves 7, shaped according to the shape of locking balls 6, and which is furnished with a slot 8 at its right hand end, terminating in a bore 9. The inner end of a compression spring 10, arranged in the said bore, rests on the bottom face of the latter, while the outer end of the said spring rests on a member 11 sliding in the slot 8. The sliding member 11 is provided with two screw-threaded teeth $11^a$ and by the action of the spring 10 is pressed onto the pin 12, riveted to and bridging the slot in the bolt 5.

Figure 3:
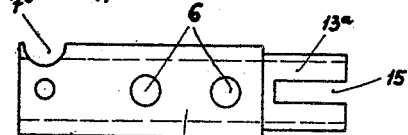
Fig. 3 is a detail view.

The locking bolt 5 fits exactly into a sleeve 13, carrying the locking balls 6, and is secured against axial movement by a pin 14. The stepped end $13^a$ of the locking ball sleeve 13 (Fig. 3) is provided with two slots 15, which are arranged diametrically opposite each other and are engaged by the screw-threaded teeth $11^a$ of the sliding member 11, the said teeth being guided in the said slots 15. A bush 20, provided with an automatically locking inner screw-thread 21, is arranged on the stepped end $13^a$ of the sleeve. The screw-thread 21 is engaged by the teeth $11^a$ of the slide 11, so that the latter is axially shifted if the bush 20 is rotated by operating the screw-cap 22. The character 22$^a$ designates a plug screwed into the screw-threaded bore of the screw-cap 22.

The inner end of the bush 20 is provided with a flange B, resting with its right-hand face against the casing 3, while the left-hand face thereof is furnished with ribs $r$ (Fig. 9) and rests on the coupling ring R of the cover K. The ring R is provided with two slits and thus two tongues $z$ are formed, which are bent towards the front face of the bush and are engaged by the ribs $r$ of the flange R for the purpose hereinafter described.

The bolt 5 is provided with a separate notch 7$^a$, which can be engaged by a spring-loaded ball 25 in order to arrest the bolt 5 independently from the locking mechanism if the bolt is in the open position. Thereby the locking bolt cannot be moved into the locking position by an unintended rotation of the adjusting member (for instance by accidently touching the same or by shocks), if the character rings 26 are accidently set in the correct positions for opening.

The slide 11 and spring 10 are arranged for the following object:—

If the character rings 26 are set in the correct positions for opening and the bush 20 is turned in the corresponding direction by means of the screw-cap 22, the teeth 11$^a$ engage the thread 21 and axially move towards the left side the slide 11 and, by means of the spring 10, the bolt 5 into the locking position, if the bore or hole, provided in the steering pillar for the admission of the bolt, is located in the position shown in Fig. 1. However if the locking bolt faces the solid part of the shell of the steering pillar, only the slide 11 will be pushed to the left by the action of the spring 10 and the locking bolt jumps forward and engages the hole of the steering pillar only after the rotation of the latter.

Figure 2:
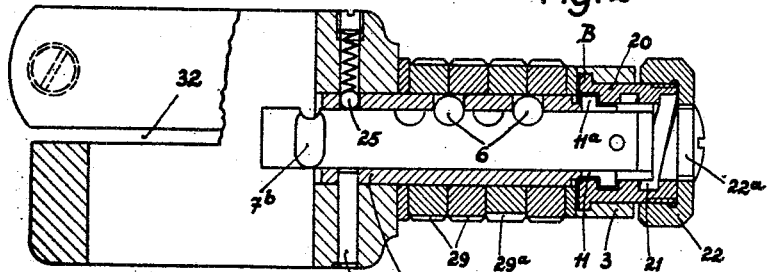
Figure 4:
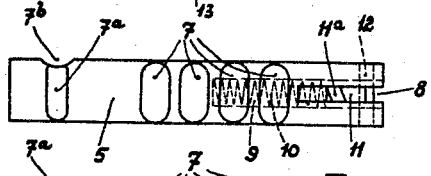
Fig. 4 is a view of the locking bolt.

As shown in Figs. 1, 2 and 4 the locking bolt 5 is provided with four notches or grooves 7, while only two locking balls 6 are arranged in the sleeve 13. In view of this arrangement, the bolt 5 is locked in the position locking the steering pillar if the two balls engage the second and fourth notches (Fig. 2), while the bolt 5 is locked in the disengaged position if the same balls engage the first and third notches.

Figure 5:
Fig. 5 is a modified construction of the locking bolt.

In the construction of the bolt shown in Fig. 4, the locking balls engage the bolt only but do not operate the slide. In the modification shown in Fig. 5, one of the slides 11 is extended and forms the rest for the engagement by the locking balls and is subjected to the action of the compression spring 10. In this case the bolt can be moved with respect to the slide even in case the lock is locked. The character 7$^b$ designates another notch or groove in the bolt, which may be provided in place of the bolt-lock formed by the notch 7$^a$ and the ball 25. A bolt 27 engages the notch 7$^b$ and is rotatably mounted in a bore of the casing of the lock. One end of this bolt is provided with an operating handles 28, while the other end thereof carries a device Z, operating the ignition device. The handle 28 is disposed in the position shown in dotted lines in Fig. 7, if the bolt 5 is in the position locking the steering pillar as shown in Fig. 1. In this position the circular part of the locking bolt 5 engages the depression 27$^a$ of the bolt 27 and thus locks the same in the position illustrated in dotted lines, so that the ignition is interrupted. The ignition can be switched on only after the bolt 5 is unlocked and has been moved into the open position, so that its notch 7$^b$ coincides with the bolt 27. By means of the handle 28, the latter can be turned into the position shown in full lines in Fig. 7, whereby the ignition is switched on. In this position the bolt 27 engages the notch 7$^b$ of the locking bolt 5 and thus locks the same, e. g. the latter can be moved into the position locking the steering pillar only in case the bolt 27 has been previously turned to such an extent, that its depression 27$^a$ releases the bolt 5. In view thereof, that the handle 28 is located in front of the numeral ring window of the lock-casing in the position in which the ignition is switched on, it is impossible to rotate the numeral rings, particularly if the handle 28 is of suitable width. The said rings can be operated only after the handle 28 has been turned into the position shown in dotted lines in Fig. 7.

If the steering pillar of a motor vehicle consists of a single tube or if its outside tube is not sufficiently secured against rotation, a sleeve 43 is pushed onto the steering pillar (Fig. 10), the said sleeve being provided with an arm 44 and by means of rivets 45 is secured to the vehicle (dash board). The lock is pushed over the sleeve 43 and the steering pillar is locked in that the locking bolt 5 passes through a hole 46 of the sleeve.

The two extreme positions of the locking bolt 5 are determined by the inner end of the slot 15 of the sleeve 13 and by the inner face of the screw-cap 22. The bolt 5 is of such a length, that in its right-hand extreme position it does not engage the shaft S but still extends into the bore $m$ of the immovable tube M or into the sleeve 43 in the arrangement according to Fig. 10.

A bush 50 (Fig. 11), slotted at 51 and 52 and provided with a hole 53 for the reception of the locking-bolt 5 which secures the bush in the casing of the lock, serves for adapting the lock to steering pillars of different diameters.

The lock is used in the following manner:—

The steering wheel is removed, the character rings are set in the position of opening, the screw-plug 22ᵃ is removed and the locking bolt 5 is moved as far as possible to the right by turning the cap 22. Now the lock is pushed on to the shell (or sleeve) of the steering pillar until the locking bolt 5 is disposed in front of the bore m of the shell M. The lock is fixed to the shell M (Fig. 1) or sleeve 43 (Fig. 10) by tightening the screw 34 (Fig. 1) and by turning the screw-cap 22 in the opposite direction, so that the locking bolt engages the steering pillar. Finally the screw-plug 22ᵃ is again applied and the character rings are rotated so as not to disclose the combination for opening the lock, and now the steering pillar is locked.

In order to unlock the steering pillar, the character rings are set into the position for releasing the bolt 5 and the cap 22 is rotated as far as possible. Thereby the locking bolt is moved into its extreme position at the right hand side in which position the said bolt has released the shaft S of the steering pillar but still engages the bore of the shell M.

At the same time the bush 20, connected with the screw-cap 22, operates the cover K by means of the front face provided with ribs r and by means of the teeth z, so that the cover K hides the view (the set unlocking combination). The cover K can be turned also without the aid of the screw-cap 22 by getting hold of the projecting rim k, whereby the spring-tongues z slide over the ribs r of the bush 20 in order to allow the character rings to be set also in case the lock is unlocked and thus secure the latter against unauthorized locking. If the lock is locked the clear view over the character rings can be obtained again by turning the handle in the opposite direction, so that the rings can be grasped and rotated.

In the case of a locked combination lock, if it is intended to open the lock by simultaneously operating the cap 22 and the character rings (locking mechanism), the bush 20 will be subjected to an equivalent back-pressure by the slide of the locking bolt 5 engaging the slot of the bush and the latter transmits the said pressure to the set of character rings, which are pressed together and thus are secured against adjustment. For this object the bush 20 and the screw-cap 22 are arranged in the casing with some play in the axial direction, so that they may rest directly against the character rings.

However in order to attain this object it is necessary that the operating member of the locking bolt (e. g. the bush 20) is arranged at the outer end of the locking bolt.

The combination lock can be taken to pieces only after the withdrawal of the bolt (through the opening of the plug 22ᵃ) and if the sleeve 13 has been pushed to the left (into the bore 2 of the lock-casing). Thus the lock can be taken to pieces only after the bore 2 is given free by removing the lock from the steering pillar. The combination lock cannot be taken to pieces as long as the lock is mounted on the steering pillar.

Between two adjacent figures each character ring is provided with notches 29 adapted to be engaged by preferably spring-loaded locking balls 30 or the like for securing the said rings in the adjusted position. One of these notches 29ᵃ (Fig. 2) is arranged one-sided on each character ring between like figures in such a manner, that the character rings can be rotated in one direction of rotation only until the corresponding locking balls engage this notch, in order to provide corresponding initial positions of all character rings for setting the same in the darkness.

As shown in Figs. 1 and 2, the casing 1 of the lock is slotted at 31 and 32 in two planes, which preferably are disposed at a right angle to one another, and is provided with ears 33, so that the casing is rendered resilient and by means of the screw 34, passed through holes of the ears, can be clamped to the steering pillar.

I claim—

1. A combination lock for locking the steering pillar of motor vehicles, comprising in combination a casing provided with a bore for the steering pillar, a lateral extension on the said casing, a combination device arranged in the said extension, a locking bolt axially slidable in the said extension transversely to the steering pillar and cooperating with the said combination device and a rotatable but axially immovable bush with a self locking inner screw thread engaging a corresponding screw thread of an axially slidable member operating the axial movement of the locking bolt.

2. A combination lock for locking the steering pillar of motor vehicles, comprising in combination a casing provided with a bore for the steering pillar, a lateral extension on the said casing, a combination device arranged in the said extension, a locking bolt axially slidable in the said extension transversely to the steering pillar and cooperating with the said combination device, a rotatable but axially immovable bush with a self locking inner screw thread engaging a corresponding screw thread of an axially slidable member operating the axial movement of the locking bolt and a cap operated by the said operating member to cover up the combination device in the unlocking position.

3. A combination lock for locking the steering pillar of motor vehicles, comprising in combination a casing provided with a bore for the steering pillar, a lateral extension on the said casing, a combination device arranged in the said extension, a locking bolt axially slidable in the said extension transversely to the steering pillar and cooperating with the said combination device, a rotatable but axially immovable bush with a self locking inner screw thread engaging a corresponding screw thread of an axially slidable member operating the axial movement of the locking bolt, a cap operated by the said operating member to cover up the combination device in the unlocking position and a ratchet coupling between the member operating the locking bolt and the cap in order to rotate the latter also independent from the said operating member.

4. A combination lock for locking the steering pillar of motor vehicles, comprising in combination a casing provided with a bore for the steering pillar, a lateral extension on the said casing, a combination device arranged in the said extension, and a locking bolt slidably arranged in the said extension transversely to the steering pillar and cooperating with the said combination device, a slot in the locking bolt, a spring arranged in the said slot, and a slide located in the said slot, for the purpose specified.

5. A combination lock for locking the steering pillar of motor vehicles, comprising in combination a casing provided with a bore for the steering pillar, a lateral extension on the said casing, a combination device arranged in the said extension, and a locking bolt slidably arranged in the said extension transversely to the steering pillar and cooperating with the said combination device, a slot in the locking bolt, a spring arranged in the said slot, a slide located in the latter, and an automatically obstructing member cooperating with the said slide, for the purpose specified.

6. A combination lock for locking the steering pillar of motor vehicles, comprising in combination a casing provided with a bore for the steering pillar, a lateral extension on the said casing, a combination device arranged in the said extension, and a locking bolt slidably arranged in the said extension transversely to the steering pillar and cooperating with the said combination device, a slot in the locking bolt, a spring arranged in the said slot, a slide located in the latter, an automatically obstructing member cooperating with the said slide, notches in the locking bolt, and locking members cooperating with the said notches, the number of notches exceeding the number of locking members, for the purpose specified.

7. A combination lock for locking the steering pillar of motor vehicles, comprising in combination a casing provided with a bore for the steering pillar, a lateral extension on the said casing, a combination device arranged in the said extension, and a locking bolt slidably arranged in the said extension transversely to the steering pillar and cooperating with the said combination device, a slot in the locking bolt, a spring arranged in the said slot, a slide located in the latter, and an additional locking means on the locking bolt securing the latter in the unlocked position independently from the lock-mechanism, for the purpose specified.

8. A combination lock for locking the steering pillar of motor vehicles, comprising in combination a casing provided with a bore for the steering pillar, a lateral extension on the said casing, a combination device arranged in the said extension, and a locking bolt slidably arranged in the said extension transversely to the steering pillar and cooperating with the said combination device, a slot in the locking bolt, a spring arranged in the said slot, a slide located in the latter, and an additional locking means on the locking bolt securing the latter in the unlocked position independently from the lock-mechanism and interrupting the circuit of the ignition device provided for the internal combustion engine of the motor vehicle if the bolt locks the steering pillar.

HEINRICH BECK.